United States Patent [19]
Mong

[11] Patent Number: 5,685,378
[45] Date of Patent: Nov. 11, 1997

[54] MULTIPLE SECTION REVERSIBLE PLOUGH

[75] Inventor: Oivind Mong, Kleppe, Norway

[73] Assignee: Kverneland Klepp AS, Kvernaland, Norway

[21] Appl. No.: 693,068

[22] PCT Filed: Jan. 11, 1996

[86] PCT No.: PCT/GB96/00044

§ 371 Date: Oct. 21, 1996

§ 102(e) Date: Oct. 21, 1996

[87] PCT Pub. No.: WO96/24237

PCT Pub. Date: Aug. 15, 1996

[30] Foreign Application Priority Data

Feb. 10, 1995 [GB] United Kingdom ............ 9502609
Dec. 22, 1995 [GB] United Kingdom ............ 9526530

[51] Int. Cl.⁶ .......................................... A01B 3/46
[52] U.S. Cl. ...................... 172/204; 172/219; 172/225
[58] Field of Search .................... 172/204, 218, 172/219, 212, 223, 260.5, 225, 452, 457, 467, 460

[56] References Cited

U.S. PATENT DOCUMENTS

| | | | |
|---|---|---|---|
| 2,882,979 | 4/1959 | Chandler et al. | 172/225 |
| 3,524,509 | 8/1970 | Richey | 172/225 X |
| 3,749,178 | 7/1973 | Watts | 172/225 |
| 3,757,872 | 9/1973 | Mellen | 172/204 X |
| 3,771,607 | 11/1973 | Mellen | 172/225 X |
| 4,691,785 | 9/1987 | Post | 172/225 X |
| 4,825,955 | 5/1989 | Watvedt | 172/255 X |
| 5,603,381 | 2/1997 | Torgrimsen | 172/219 |

FOREIGN PATENT DOCUMENTS

WO 94/24842  11/1994  United Kingdom .

*Primary Examiner*—Terry Lee Melius
*Assistant Examiner*—Robert Pezzuto
*Attorney, Agent, or Firm*—Sheridan Ross P.C.

[57] ABSTRACT

A reversible plough (10) which is intended to be mounted on and towed behind a propelling vehicle, and which comprises a forward section (11) with reversible plough bodies, a rear section (13), and an intermediate wheel supported section (12, 112) which supports the rear end of the forward section and the forward end of the rear section, in which: an adjustable 3-point support linkage (28, 53, 58) is mounted on the intermediate section (12) and which supports the forward end (22) of the rear section (13), and which is adjustable to control the inclination of the plough beam (23, 123) of the rear section, and a headstock type of coupling (29, 50) which interconnects the 3-point support linkage and the forward end (22) of the rear section which permits rotary adjustment of the rear plough beam for plough body reversal, and without taking any part in this adjustment movement.

13 Claims, 8 Drawing Sheets

MULTIPLE SECTION REVERSIBLE PLOUGH

This invention relates to a multiple section reversible plough which comprises a forward section which is adapted to be coupled with the rear end of a propelling vehicle, a rear section, and a wheel-supported intermediate section which supports a rear end of said forward section and a forward end of said rear section, and in which at least the forward and rear sections carry sets of reversible plough bodies.

Multiple section reversible ploughs of this type are known e.g. from GB 2264216 or WO94/24842, and in which the plough sections can pivot relative to each other so as to take up any new positions suitable for movement of the plough in a reverse direction after reversal of the plough bodies.

It is also known to provide a transverse pivot axis i.e. a substantially horizontal axis when the plough is on level ground, and which extends perpendicular to the general direction of travel of the multiple section combination, in which this transverse pivot axis is located between the rear end of the intermediate section and the forward end of the rear section, and which allows pivotal inclination of the rear section to be adjusted about this axis to suit requirements.

In a semi-mounted reversible plough, it is usual to provide a headstock at the forward end of the forward section, and which forms part of the fixed structure of the plough frame to be coupled with usual 3-point linkage at the rear of a tractor, and to provide a means whereby a plough beam of the forward section (carrying pairs of reversible plough bodies) can pivot through approximately 180° relative to the headstock at the forward end of the plough beam in order to reverse the plough bodies i.e. to move the upper inoperative plough body of each pair to a lower operative ploughing position.

It is also known to provide an arrangement whereby a plough beam of the rear section (also carrying pairs of reversible plough bodies) can rotate through approximately 180° relative to its mounting on the rear end of the intermediate section, in order to reverse its plough bodies.

The invention is concerned with a novel arrangement of intermediate section, in a multiple section reversible plough (preferably of the semi-mounted type), and in which said arrangement provides an improved means for adjusting the inclination of the rear section relative to the intermediate section about a pivot axis which extends generally parallel to the surface of the ground which is being ploughed and substantially perpendicular to the direction of forward travel.

The construction of the front and rear plough sections, namely the plough beams and plough bodies thereof, may be of standard construction if. required, and the only essential requirement of the invention is to provide an improved means of pivotally mounting the forward end of the rear section on the rear end of the intermediate section.

Accordingly, the invention provides a reversible plough which is intended to be mounted on and towed behind a propelling vehicle, e.g. a tractor, and which comprises:

a forward section having a plough beam provided with a number of pairs of reversible plough bodies arranged along its length, said plough beam being adjustably mounted at its forward end in order to move an upper inoperative plough body of each pair to a lower ploughing position whereby to reverse the plough bodies;

an intermediate wheel-supported section arranged to support a rear end of said forward section; and a rear section pivotally supported at its forward end by said intermediate section and having a plough beam provided with a number of pairs of reversible plough bodies arranged along its length, said plough beam being adjustably mounted at its forward end to move an upper inoperative plough body of each pair to a lower ploughing position in order to reverse the plough bodies;

characterised by:

1) an adjustable 3-point support linkage which is mounted on said intermediate section and which is coupled with the forward end of said rear section, said linkage serving to control the inclination of the plough beam of the rear section relative the intermediate section whereby a) the rear section can be lifted by the linkage during plough body reversal and b) the rear section can be adjusted to any desired inclination for ploughing; and 2) a coupling between said linkage and the forward end of the rear section which permits adjustment of the-plough beam of the rear section for plough body reversal and without taking part in this adjustment movement.

Therefore, a single adjustable component of the linkage may be used to carry out 1) upward adjustment of the rear section prior to and/or during plough body reversal and 2) any required adjustment of the inclination of the rear section plough beam for ploughing.

Preferably, the forward end of the rear section plough beam is rotatably mounted on a headstock, said headstock being located generally in the region of the junction between the intermediate section and the rear section. It should be understood that the precise location of the headstock is not critical, and it may form a component part of the intermediate section, or of the rear section, or be located in a general region between the rear end of the intermediate section and the forward end of the rear section.

Conveniently, the 3-point linkage is of a type known per se for mounting at the rear end of a tractor, and the top link may be of fixed length, or may comprise an adjustable link e.g. a hydraulically adjusting cylinder. However, other parts of the linkage may be arranged to be adjustable, if desired e.g. both of the lower links of the 3-point linkage.

Preferably, a single wheel set (a pair of wheels) support the intermediate section, and this wheel set may be mounted at the rear end of the intermediate section. Adjust merit means e.g. hydraulic adjusting cylinders may be provided to adjust the height of the rear end of the intermediate section relative to the wheel set.

An adjustable depth control wheel may be mounted at the rear end of the rear section, to assist in setting any required ploughing depth, and adjustment of the depth wheel may be coordinated with adjustment of the wheel set of the intermediate section and/or adjustment of the inclination of the plough beam of the rear section via said linkage.

Preferred embodiments of multiple section reversible plough according to the invention will now be described in detail, by way of example only, with reference to the accompanying drawings, in which.

Figure 1:
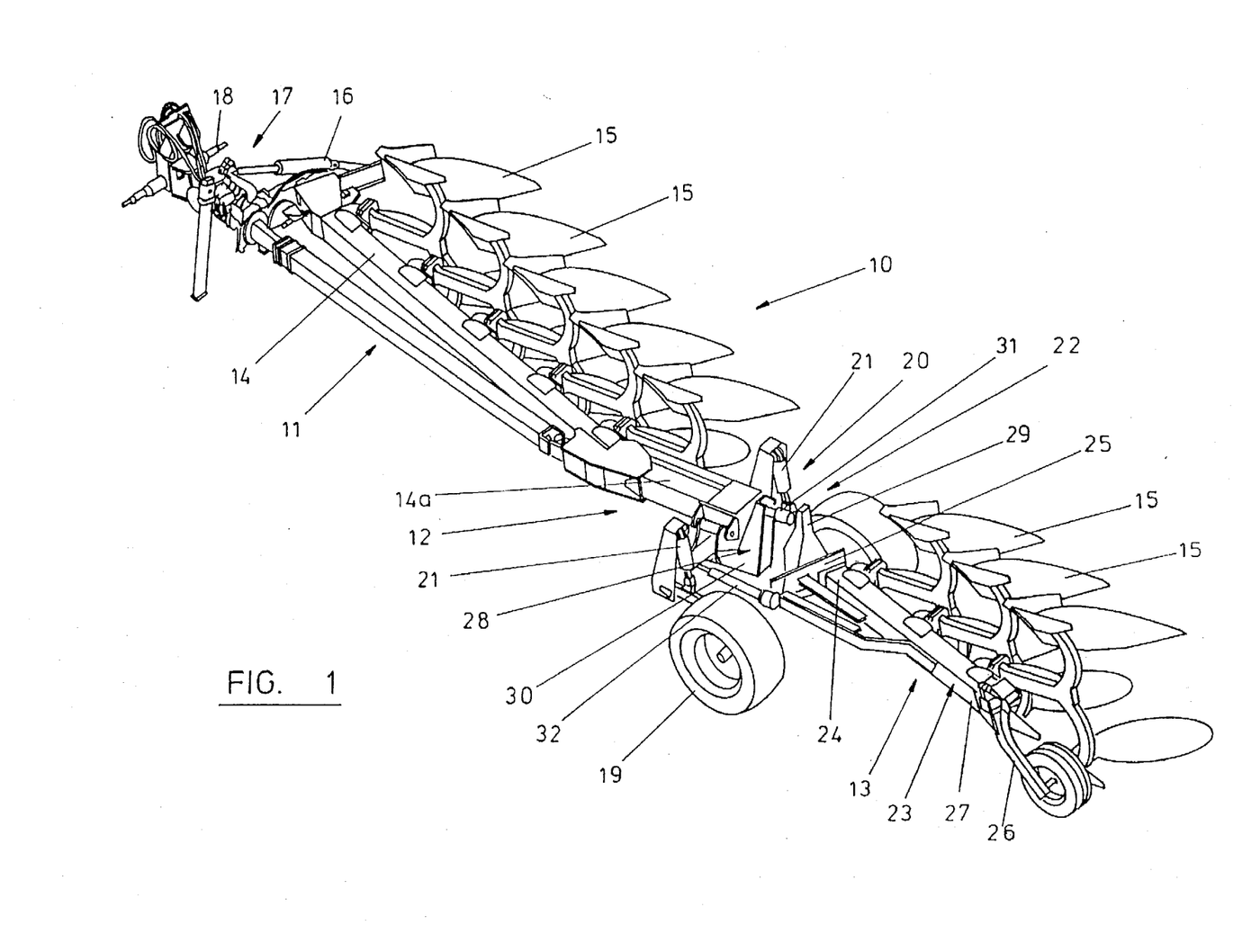
FIG. 1 is a perspective view, from one side (the non-ploughing side) of a first embodiment of semi-mounted reversible plough according to the invention, comprising forward and rear sections provided with pairs of reversible plough bodies, and an intermediate section interconnecting the forward and rear sections.
Figure 2:
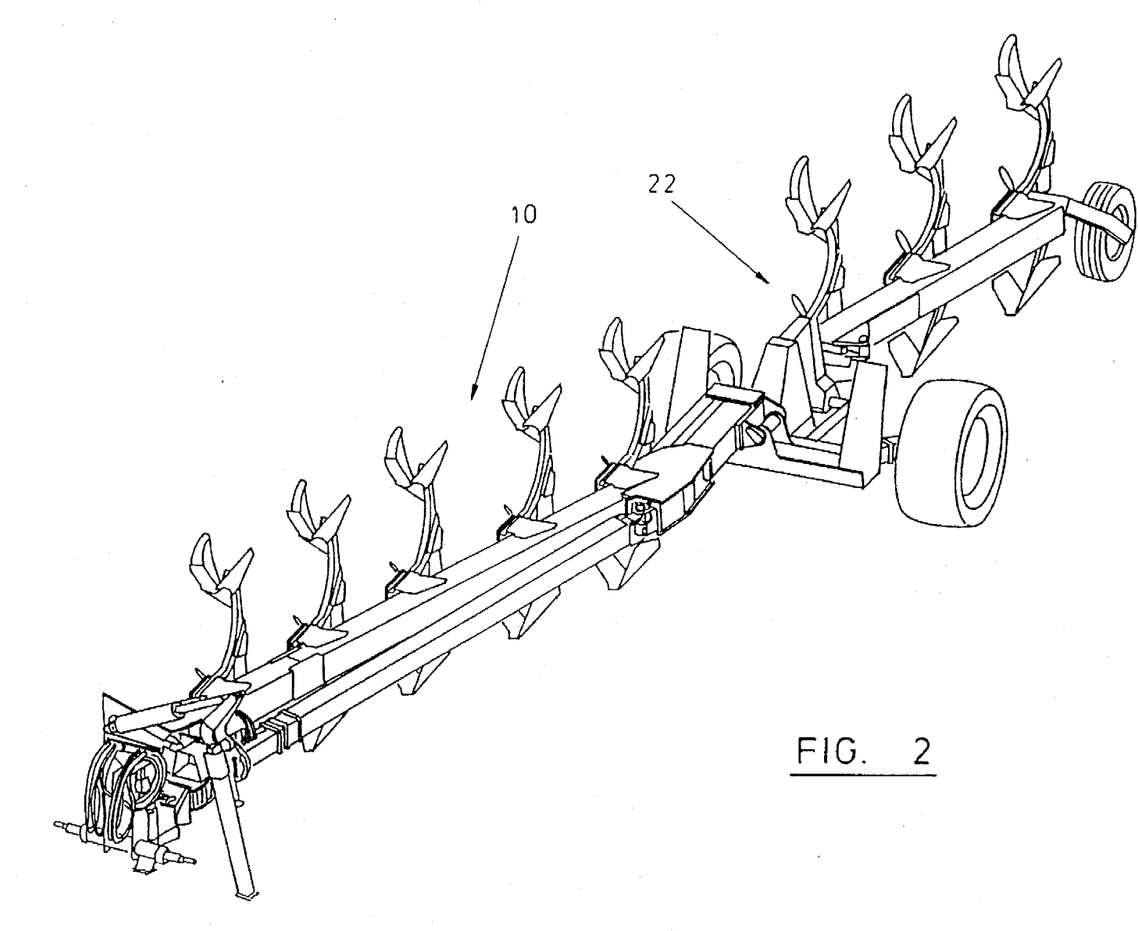
FIG. 2 is a perspective view of the plough shown in FIG. 1, but while also being viewed from the non-ploughing side, being also taken generally in a rearwardly looking direction along the length of the plough section combination.
Figure 3:
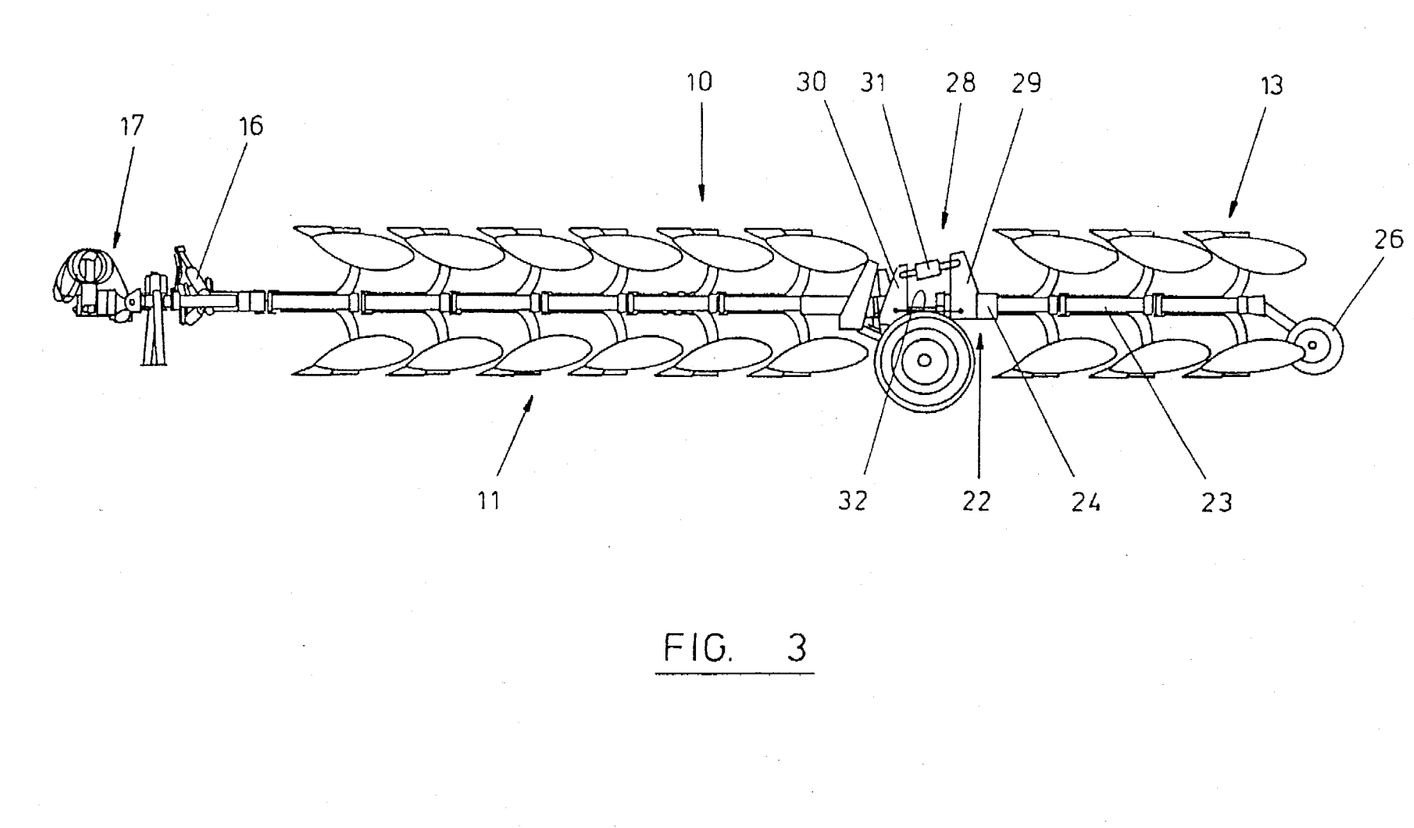
FIG. 3 is a side view of the multiple section combination shown in FIGS. 1 and 2.

Referring first to FIGS. 1 to 3 of the drawings, a preferred embodiment of the invention will be described in relation to a multiple section semi-mounted reversible plough of the type shown in GB 2264216A or WO94/24842. This is for convenience and by way of example only, and the major novel and inventive aspects of the new design are embodied in a re-designed means of mounting the forward end of the rear section on the intermediate section. The forward section and the rear section may be of generally standard construction if required, namely the plough beams and plough bodies thereof. However, of course, alternative designs of forward and rear sections may be provided, within the scope of the present invention, and having the novel and inventive means of pivotally mounting the forward end of the rear section on the intermediate section.

The construction and operation of a semi-mounted reversible plough will be well-known to those of ordinary skill in the art, and therefore need not be described in detail herein. The multiple-section reversible plough according to the invention is therefore designated generally by reference 10, and comprises forward section 11, intermediate section 12 and rear section 13.

The forward section 11 has a plough beam 14 provided with a number of pairs of reversible plough bodies 15 arranged along its length, in which the plough beam 14 is adjustably mounted at its forward end in order to carry out rotational adjustment under the action of hydraulic cylinder 16 through approximately 180° about a pivot axis provided by a headstock, in order to reverse the plough bodies i.e. in order to move an upper inoperative plough body of each pair in one working position so as to take up a lower ploughing position in an alternative working position, when it is desired to reverse the plough bodies e.g. after completing one working pass along a field, and prior to carrying out a reverse pass along the field alongside the previously ploughed area.

The forward end 17 of forward section 11 is adapted to be mounted on pull bars (not shown) of a 3-point linkage of a tractor via drag shaft 18, and is also coupled with the top linkage in known manner, to enable plough 10 to be "semi-mounted" at the rear of a tractor or other propelling vehicle.

The intermediate section 12 is a wheel-supported section having a single wheel set 19 comprising a pair of wheels mounted at a rear end 20 of intermediate section 12, wheels 19 being upwardly and downwardly adjustable under the control of hydraulic adjusting cylinders 21, to vary the height above the ground of intermediate section 12 (and also to adjust the height of the rear end of the forward section 11).

Therefore, the intermediate section 12 supports the rear end of the forward section 11, and in the illustrated embodiment forms an angled and rigid extension of front plough beam 14. Thus, beam 14a of the intermediate section 12 is coupled with the rear end of front plough beam 14, and the rear end of beam 14a is rotatably mounted so that both the beam 14 and beam 14a can rotate together during reversal of the plough bodies of the forward section 11.

Therefore, in this embodiment, the wheel-supported intermediate section 12 effectively forms an integral component part of the forward section 11. However, in other embodiments within the scope of the invention, the intermediate section 12 may comprise a separate component, in that the forward section 11, intermediate section 12 and rear section 13 can pivot relative to each other, to carry out transverse movement over the ground surface after each reversal of the plough bodies. This enables the sections to adjust themselves automatically and laterally, to take-up necessary lateral spacings from each other after each reversal of the plough bodies and prior to commencing a reverse ploughing pass along a field.

The rear section 13 is pivotally connected at its forward end (designated generally by reference 22) to rear end 20 of intermediate section 12, and has a plough beam 23 provided with a number of pairs of reversible plough bodies 15 arranged along its length. The forward end 24 of plough beam 23 is rotatably mounted on a headstock structure shown schematically by reference 25, so as to be capable of carrying out rotational adjustment movement relative to headstock 25 about a pivot axis and through approximately 180°, in order to reverse the plough bodies 15. An adjustable depth control wheel 26 is mounted at the rear or trailing end 27 of plough beam 23, for adjusting the ploughing depth. The adjustment of depth control wheel 26 may be co-ordinated with adjustment of the wheels 19, and/or adjustment of the inclination of the axis of plough beam 23 relative to rear end 20 of intermediate section 12.

FIGS. 1 and 2 show the plough bodies of the two sections of the plough in one working position, and the manner by which the plough bodies can be reversed to an alternative working position, at the end of each ploughing pass along a field, will be well-known to those of ordinary skill in the art, and need not be described in detail herein. Evidently, during a return ploughing pass, with the plough bodies reversed, relative lateral pivotal adjustment of the plough sections 11, 12 and 13 must take place, to take into account the fact that the combination is now moving in an opposite direction, and with the plough bodies reversed to the other side of the combination.

There will now be described in detail one example, schematically only, of an improved means of pivotally mounting the forward end 22 of the rear section 13 on the rear end 20 of the intermediate section 12.

The intermediate section 12 has an adjustable 3-point support linkage mounted thereon, and this is preferably of a type known for mounting at the rear of a tractor. The linkage is designated generally by reference 28, and this is coupled with the forward end 22 of the rear section 13, as can be seen in FIGS. 1 and 2, and more particularly from FIG. 3. The purpose of linkage 28 is to control the inclination of the plough beam 23 of the rear section 13, whereby: a) the rear section 13 can be lifted, relative to the rear end 20 of the intermediate section 11, during plough body reversal; and b) the rear section 13 can be adjusted to any desired inclination for ploughing.

A coupling is provided between linkage 28 and the forward end 22 of the rear section 13, and is designated generally by reference 29. The construction of coupling 29 will be described in more detail below, but essentially it is of such a type that it can permit rotational adjustment of plough beam 23 for the purposes of plough body reversal, and without taking any part in this adjustment movement. The coupling 29 preferably is effectively equivalent to a known "headstock", in that it provides a fixed i.e. non rotational mounting which permits rotational adjustment of plough beam 23 for the purposes of plough body reversal. The forward end 24 of plough beam 23 is therefore rotatably mounted in the headstock of coupling 29, and this rotational adjustment can take place, without moving, or having any effect on the ability of coupling 29 to be pivotally adjusted about a transverse pivot axis for the purposes of adjusting the inclination of plough beam 23 as referred to above.

Going back now to the 3-point support linkage 28, in the illustrated arrangement this comprises a mounting block 30 which is fixedly mounted on intermediate section 12, and from the top of which there extends a top link 31 which interconnects mounting block 30 and an upper end of coupling 29 (headstock). Top link 31 may comprise a link of fixed length, or preferably comprises an adjustable length link, such as a hydraulically adjustable link. The two further parts of the 3-point support linkage may comprise links generally equivalent to known "pull bars" (not shown) of a 3-point linkage of a tractor, and which are pivotally connected to a lower part of coupling 29. The lower links of 3-point linkage 28 are shown only schematically by reference 32 in the drawings. Evidently, the means by which coupling 29 is mounted on support linkage 28 may be generally similar to the way in which the forward end of a semi-mounted plough is mounted on a 3-point linkage at the rear of a tractor. This is a unique concept applied to an intermediate section of a multiple section reversible plough, and giving rise to the technical advantages referred to above, i.e. that the rear plough section can be raised during plough body reversing; and also its inclination can be controlled during ploughing. All of this can take place under the control of any suitable adjustable link in the coupling together between 3-point linkage and the coupling 29. Furthermore, most importantly, none of these co-operating parts take any part in the reversing motion of the plough bodies, since there is effectively a "headstock/3-point linkage" type of connection between the rear plough section and the intermediate plough section.

When, as is preferred, a hydraulically adjusting cylinder is used to control the angular adjustment of the rear plough section (about a generally horizontal axis extending perpendicular to the general axis of the combination), only a single cylinder is required to maintain control of the rear plough section, and such a single cylinder does not take any part in the "plough body reversing" movement of the plough. It is expected that this will result in simplifying the entire operation of the plough section combination, both during plough body reversal and during ploughing.

Figure 4:
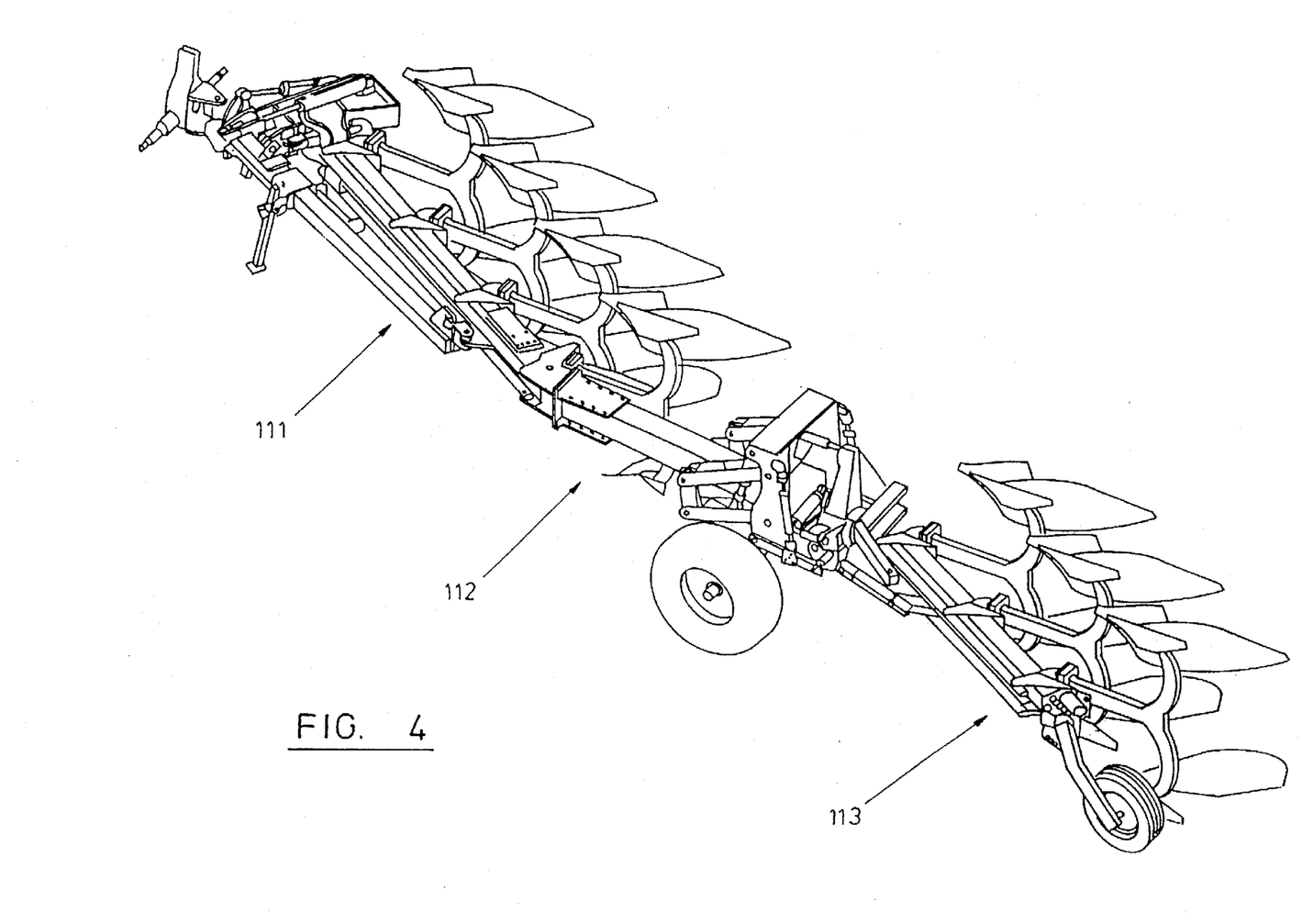
FIG. 4 is a perspective view, similar to FIG. 1, of a second embodiment of semi-mounted reversible plough according to the invention.
Figure 5:
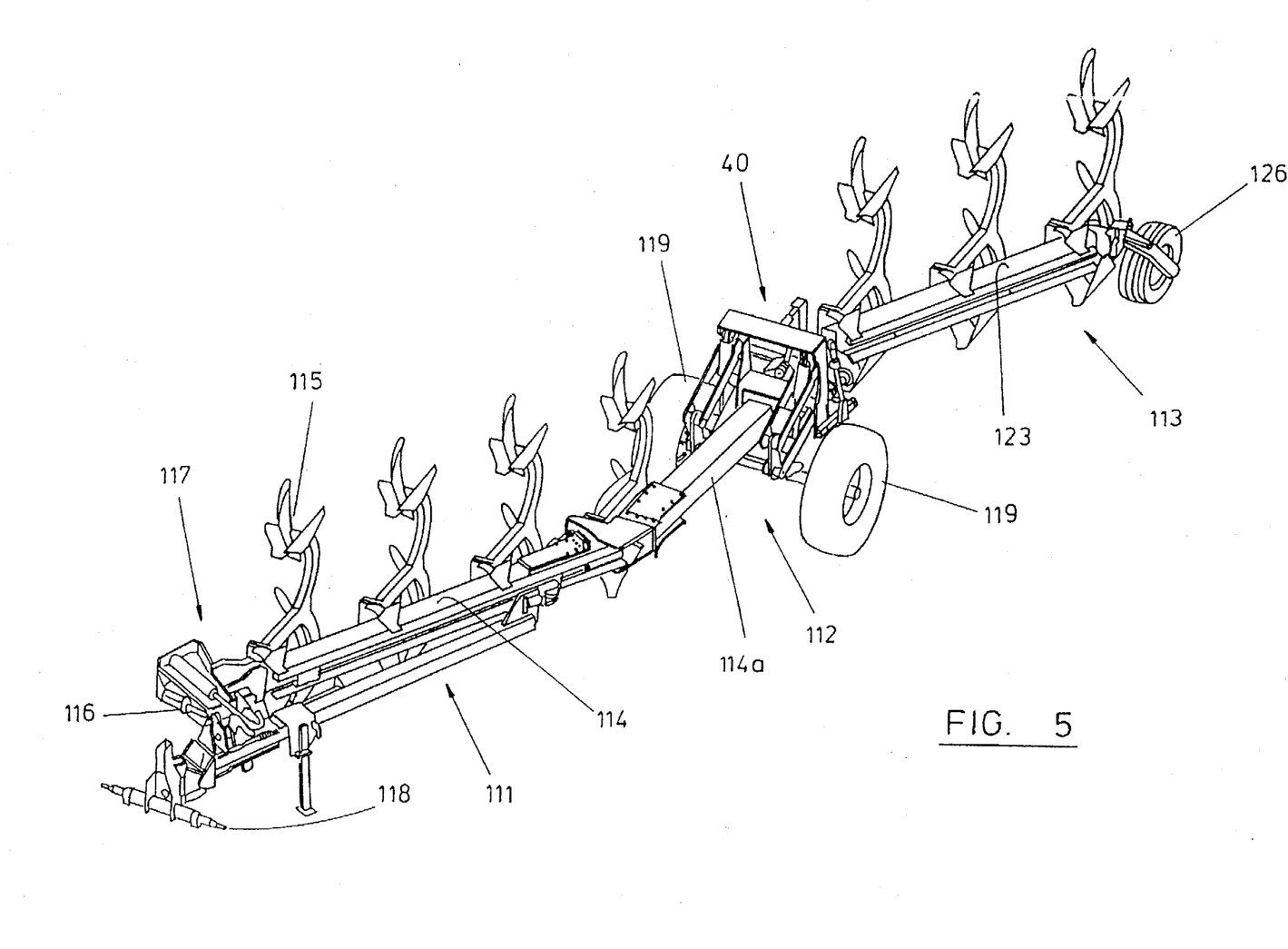
FIG. 5 is a perspective view, similar to FIG. 2, of the second embodiment shown in FIG. 4.
Figure 6:
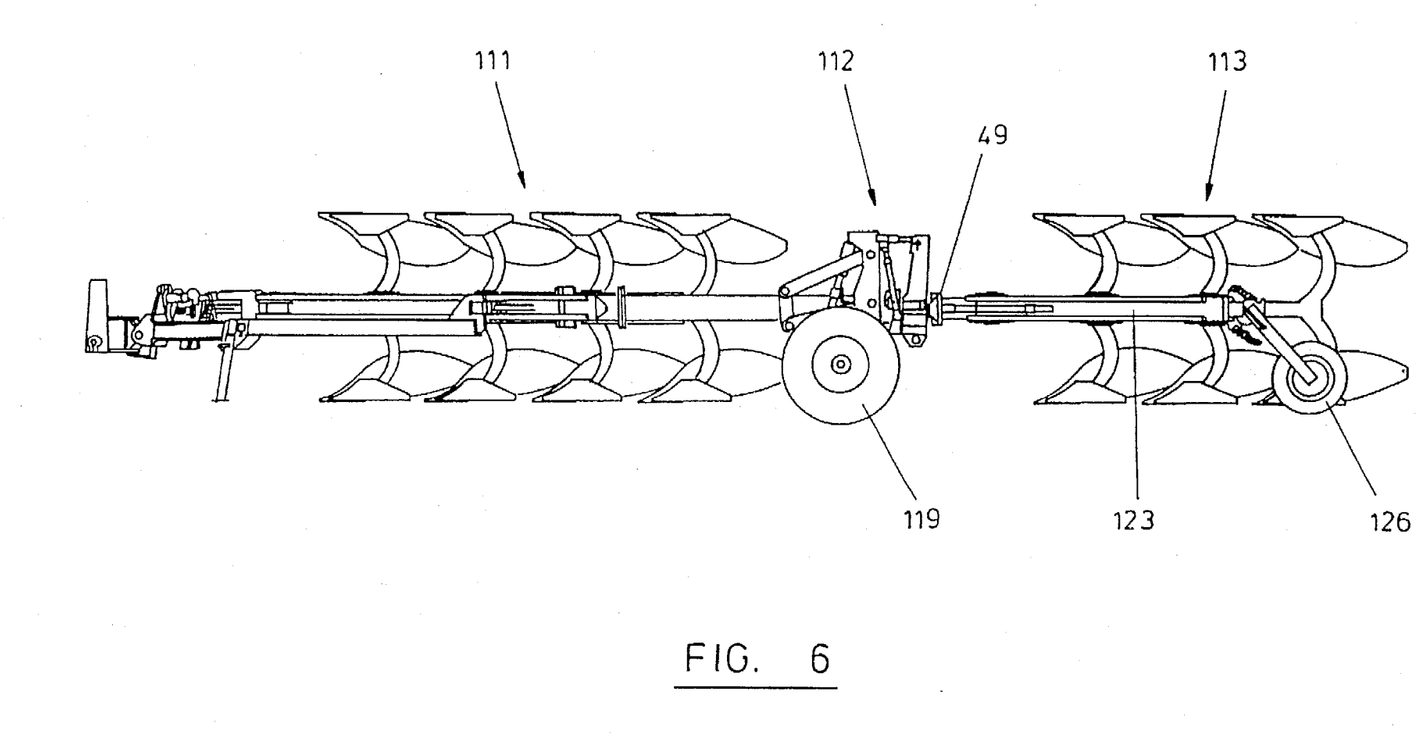
FIG. 6 is a side view of the second embodiment.

Referring now to FIGS. 4 to 8, a second embodiment of multiple section reversible plough according to the invention will now be described, and parts generally corresponding with those described with reference to the first embodiment are given the same reference numerals, but with the addition of 100. FIGS. 4, 5 and 6 correspond generally with FIGS. 1, 2 and 3 of the first embodiment, but this second embodiment has a different arrangement of support for the rear end of the front section 111, and for the forward end of the rear section 113.

The intermediate section 112 forms a rigid component part of the forward section 111, and the wheelset 119 supports the rear end of the forward plough beam 114 indirectly, in that intermediate frame beam 114a of the intermediate section 112 forms a rigid angled extension of the forward plough beam 114. The rear end of beam 114a is rotatably mounted, in a manner to be described in more detail below, to allow the beams 114 and 114a to rotate jointly under the action of forward mounted turn-over mechanism 116, for the purposes of reversing the plough bodies 115.

The rear section 113 has its forward end supported by the intermediate section 112, via a 3-point linkage which will be described in more detail below. Adjustment of the 3-point linkage allows the rear section 113 to be adjusted to any desired inclination for ploughing, and furthermore permits the entire rear section to be upwardly tilted during plough body reversal.

Figure 7:
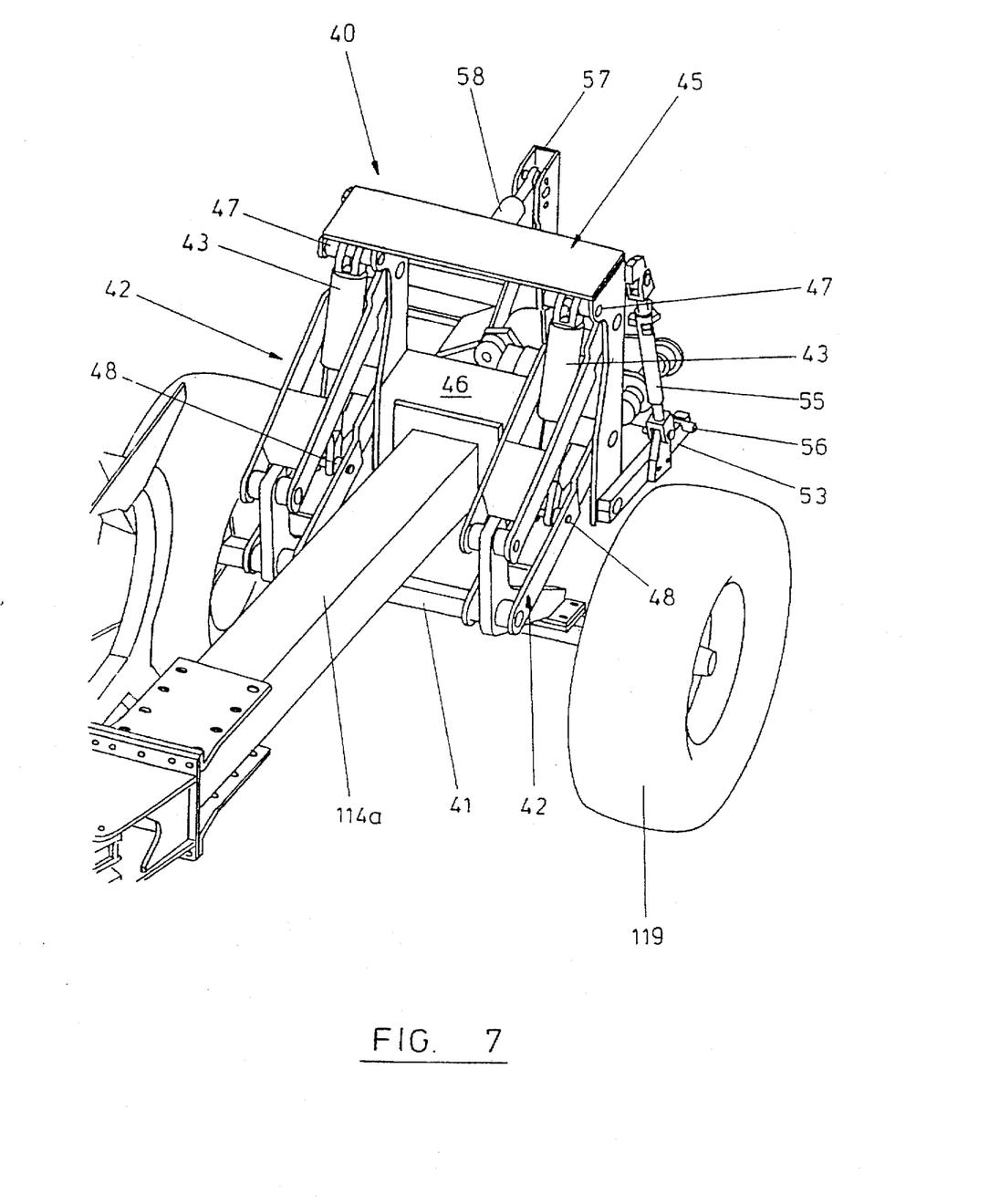
FIG. 7 is a rearwardly looking perspective view of a detail of the second embodiment, namely a different arrangement of coupling between the rear plough section (not shown) and the wheel-supported intermediate section; and, FIG. 8 is a perspective view from one side of the different arrangement of coupling shown in more detail in FIG. 7.
Figure 8:
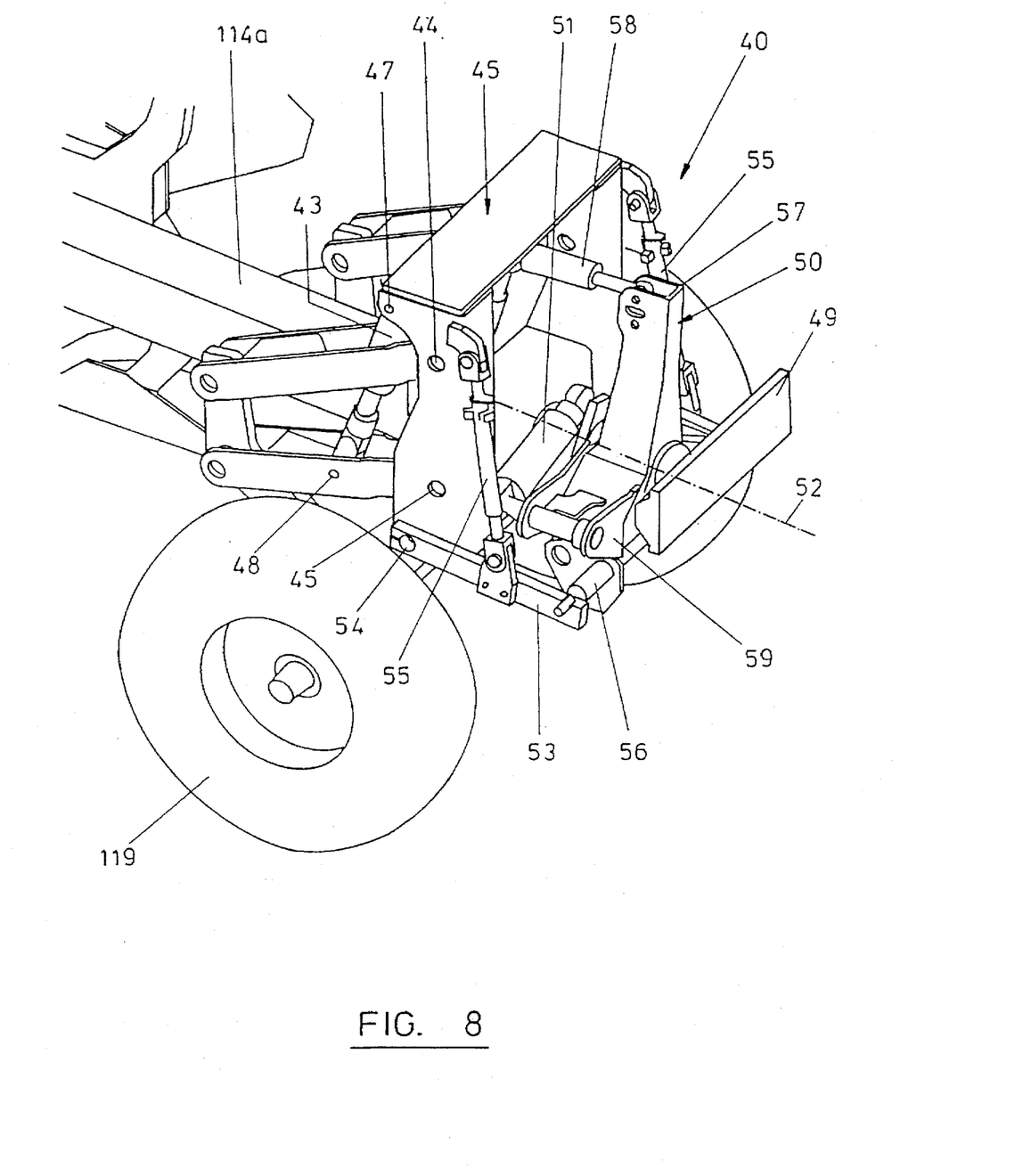

A different arrangement of "coupling" is provided on the intermediate section 112, as can be seen in more detail in FIGS. 7 and 8. An adjustable 3-point support linkage is designated generally by reference 40, and is mounted on the rear end of the frame beam 114a, and serves the dual purpose of: (a) supports the rear end of the forward section 111; (b) supports the forward end of the rear section 113; (c) can be height adjusted by raising and lowering of the wheelset 119, to vary the height of the forward end of the rear section 113, and the height of the rear end of the forward section 111; and (d) can be adjusted in order to vary the inclination of the plough beam (123) of the rear section (119).

The height of the rear end of frame beam 114a is adjustable, by upward and downward adjustment of the wheelset 119, and this is achieved by a different mechanism in the embodiment of FIGS. 4 to 8, from the first embodiment shown in FIGS. 1 to 3. The axle 41 which supports the wheelset 119 is carried by a parallelogram or 4-bar linkage, designated generally by reference 42, arranged one at each side of the beam 114a, and this linkage, upon adjustment, effects substantially up and down movement of the axle 41 only. Each four bar linkage 42 is adjustable under the control of a respective hydraulic cylinder 43, and it will be noted, particularly from FIG. 8, that the linkages 42 extend forwardly from upper and lower pivot mountings 44 and 45 provided on a rigid cradle 45.

Cradle 45 is mounted rigidly on the rear end of beam 114a via a mounting block 46, and operation of the cylinders 43 causes a reaction between the upper pivot mounting 47 of the cylinders 43 on the cradle 45, and lower pivot connections 48 to the four bar linkages 42, so as to adjust the height of the axle 41 relative to beam 114a.

The different mounting arrangements for the wheelset 119 is advantageous, as shown in FIGS. 7 and 8, compared with the first arrangement of the embodiment of FIGS. 1 to 3, in that substantially only up and down movement in adjustment of the wheelset 119 takes place, and only a very small proportion of forward or rearward movement. This reduces the amount of space which has to be made available to permit adjustment movement of the wheelset 119. In addition, the arms of the four bar linkage 42 project forwardly of the cradle 45, one on either side of the beam 114a, and therefore do not obstruct or in any way restrict the mounting, and operation of the components of the coupling 40 which are utilised to mount the rear section 113.

The rear section 113 is largely omitted from FIGS. 7 and 8, for ease of illustration, apart from showing a front bracket 49 (see FIG. 8) which forms a forward mounting part of the beam 123 of the rear section 113.

A "headstock" 50 serves to mount the rear section 113 on a 3-point linkage provided on the intermediate section 112, and the front bracket 49 is rotatably mounted on the headstock 50 for rotating movement through approximately 180°, between one working position of the reversible plough bodies i.e. right side ploughing, and the other working position, namely left side ploughing. Rotation of the plough beam 123 is obtained under the action of a turn-over cylinder 51, which rotates the rear section about pivot axis 52, which extends generally in the direction of travel, and parallel to the surface of the ground over though the plough is moving.

The 3-point linkage provided on the intermediate section 112 takes the form of a pair of lower links 53, pivoted at their forward ends on the cradle 45 via pivots 54, and which can be upwardly and downwardly adjusted under the action of adjusting sleeves or other adjustment devices 55. This allows the height of the forward end of the rear plough beam 123 to be adjusted independently of the height of the rear end of the forward section 111 (which is controlled solely by the adjustment of the wheelset 119). The headstock 50 is mounted on the lower links 53 via pivot mountings 56, whereas the upper part 57 of the headstock 50 is connected to an adjustable top link 58 mounted on the cradle 45. Adjustment of the top link 58 allows adjustment of the inclination of the headstock 50 angularly about the lower pivot mountings 56, thereby to adjust the inclination of the rear plough beam 123.

The arrangement of the four bar linkages 42, and the single cradle 45, provides a more compact arrangement, forming an integral part of the intermediate section 112. As indicated above, adjustment of the wheel adjusting cylinders 43 causes adjustment in the height of the rear end of the intermediate frame beam 114a above the ground, and which thereby controls, jointly, the height of the rear end of the forward section 111, and the forward end of the rear section 113. However, as indicated above, independent additional height adjustment of the front end of the rear section 113 can be achieved by upward and downward adjustment of the lower links 53 of the 3-point linkage under the control of the adjusting devices 55.

The turn-over cylinder 51 occupies the space defined within the plane of the three sides of the cradle 45, and reacts against a bracket 59 mounted on one side of the headstock 50, near to a lower end thereof, and operation of the cylinder 51 causes rotation of the rear section 113 about the axis 52, as described above.

In the illustrated embodiment of FIGS. 4 to 8, the intermediate wheel supported section 112 effectively forms an integral part of the front plough section 111. However, it is within the scope of the invention for intermediate section 12 to be separate from the front section 111 (not shown), in the sense that relative pivoting therebetween can take place about an upright axis, for the purposes of lateral adjustment during plough body reversal.

Therefore, for the purposes of the present specification, and particularly the invention as claimed, it should be understood that the reference to a "intermediate wheel-supported section" includes both possibilities, namely: (a) an arrangement in which the intermediate section is an integral part of the front ploughing section; and, (b) an arrangement in which the intermediate wheel supported section is a separate component, allowing independent adjustment of the forward section (11, 111) relative thereto.

I claim:

1. A reversible plough which is intended to be mounted on and towed behind a propelling vehicle, and which comprises;

a forward section having a forward end and a rear end, said forward section comprising a plough beam having a number of pairs of reversible plough bodies arranged along its length, and said plough beam being adjustably mounted at its forward end in order to move an upper inoperative plough body of each pair to a lower ploughing position in order to reverse the plough bodies;

an intermediate wheel-supported section arranged to support the rear end of said forward section; and, a rear section having a forward end and a rear end, said forward end being supported by said intermediate section, and said rear section comprising a respective plough beam having a number of pairs of reversible plough bodies arranged along its length, and being adjustably mounted at its forward end to move an upper inoperative plough body of each pair to a lower ploughing position in order to reverse the plough bodies; characterized by:

1) an adjustable 3-point support linkage which is mounted on said intermediate section and which is coupled with the forward end of said rear section, said linkage serving to control the inclination of the ploughbeam of the rear section relative to the intermediate section whereby: a) the rear section can be lifted by the linkage during plough body reversal; and b) the rear section can be adjusted to any desired inclination for ploughing; and 2) a coupling between the linkage and the forward end of the rear section which permits rotary adjustment of the plough beam for plough body reversal and without taking part in this adjustment movement.

2. A reversible plough according to claim 1, including a drag shaft at the forward end of the forward section and adapted to be mounted on pull bars at the rear of the propelling vehicle in order that the plough can be semi-mounted on the vehicle.

3. A reversible plough according to claim 1, in which said 3-point support linkage comprises an upper adjustable top link and a pair of lower links.

4. A reversible plough according to claim 1, in which said coupling comprises a headstock in which the forward end of plough beam of the rear section is rotatably mounted.

5. A reversible plough according to claim 1, including a depth control wheel mounted at the trailing end of said rear section.

6. A reversible plough according to claim 5, including a wheel set supporting said intermediate section, and adjustment means for coordinating the adjustment of the depth control wheel with adjustment of the wheel set.

7. A reversible plough according to claim 5, including adjustment means for coordinating the adjustment of the depth control wheel with angular adjustment of the inclination of the plough beam of said rear section.

8. A reversible plough according to claim 1, in which the intermediate section includes a beam, and a cradle mounted on said beam, said 3-point linkage being mounted on said cradle.

9. A reversible plough according to claim 8, including adjustment devices mounted on said cradle and operative to adjust the lower links of the 3-point linkage.

10. A reversible plough according to claim 8, including a four bar linkage mounted on said cradle, and a wheelset supporting said intermediate section and having an axle mounted on said four bar linkage, said linkage being adjustable in order to vary the height above the ground of the cradle.

11. A reversible plough according to claim 10, including an adjustable cylinder mounted on the cradle at one end, and connected at its opposite end to the four bar linkage, and being operable to adjust the linkage so as to cause generally up and down adjustment movement of the axle relative to the cradle.

12. A reversible plough according to claim 8, including a pair of four bar linkages, and a frame beam of the intermediate section, each four bar linkage being arranged one on either side of the said frame beam.

13. A reversible plough according to claim 1, in which the intermediate section forms an integral component of the forward section.

* * * * *